(12) United States Patent
Bartz

(10) Patent No.: US 6,722,518 B1
(45) Date of Patent: Apr. 20, 2004

(54) ROTATABLE DRINK OPENING COVER

(76) Inventor: Douglas Michael Bartz, 3953 Feerwood Ct., Bloomington, IN (US) 47404

( * ) Notice: Subject to any disclaimer, the term of this patent is extended or adjusted under 35 U.S.C. 154(b) by 0 days.

(21) Appl. No.: 10/338,201

(22) Filed: Jan. 7, 2003

(51) Int. Cl.[7] ............................................... B65D 51/18
(52) U.S. Cl. .................... 220/254.4; 220/729; 220/906
(58) Field of Search .............................. 220/254.4, 729, 220/821, 906

(56) References Cited

U.S. PATENT DOCUMENTS

| 4,537,326 A | | 8/1985 | Morehead | |
|---|---|---|---|---|
| 4,842,159 A | * | 6/1989 | Heidrich | 220/714 |
| 4,852,763 A | | 8/1989 | Demberio | |
| 4,938,379 A | | 7/1990 | Kellner | |
| 5,199,591 A | * | 4/1993 | Thibeault et al. | 220/253 |
| 5,285,924 A | * | 2/1994 | Morris | 220/694 |
| 5,351,853 A | * | 10/1994 | Shock | 220/729 |
| 5,720,412 A | | 2/1998 | Ficken | |
| 5,845,801 A | | 12/1998 | Heitl | |
| 5,887,742 A | | 3/1999 | Lewis | |
| 6,098,830 A | | 8/2000 | Jamieson | |
| 6,588,617 B1 | * | 7/2003 | Majcen et al. | 220/254.4 |
| 6,626,314 B1 | * | 9/2003 | McHenry et al. | 220/254.2 |

* cited by examiner

Primary Examiner—John A. Ricci

(57) ABSTRACT

A rotatable cover for a tab actuated drink opening in a conventional beverage container, which cover is easily installed and removed, is reusable, and prevents the entry of objectionable debris including insects. The cover, having a bottom surface larger than the drink opening, includes a recessed top portion adapted to receive and engage the tab actuator securing it to the container. The cover and tab actuator rotate in concert to cover and uncover the drink opening.

4 Claims, 3 Drawing Sheets

ROTATABLE DRINK OPENING COVER

CROSS-REFERENCE TO RELATED APPLICATIONS

"Not Applicable"

STATEMENT REGARDING FEDERALLY SPONSORED REASEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF INVENTION

Conventional beverage containers typically have a tab actuator that may be pivoted to shear a drink opening in the top of the container. It is a shortcoming of such containers that they do not provide a means by which the drink opening is protected from the entry of insects, dusts, and other objectionable debris. It is also a shortcoming of these containers that once opened, they do not provide a means to prevent spillage at times when the container is jostled, bumped, or otherwise casually disturbed.

Various types of beverage container drink opening covers have been proposed in the prior art. U.S. Pat. No. 5,845,801 for example, discloses a cover that is built into the container at the time of manufacture. This flow through device includes a plurality of apertures that align with the drink opening to allow the consumer to drink from the can while preventing insects from entering the container.

Since this cover is built into the container, it will be discarded after one use. Moreover, due to the increased cost of manufacturing, this device has not been shown to be commercially viable.

U.S. Pat. No. 4,537,326 discloses a consumer applied device that uses an adhesive as the means by which a flow through cover is attached to the container. The use of an adhesive in this manner limits the devise to a disposable, one time use cover that is considered wasteful and requires the inconvenience and cost of purchasing replacement covers.

Because the above described and other flow through devices do not completely cover the drink opening, they fail to fully protect the container from the entry objectionable debris. Furthermore, because insects are attracted to the beverage inside the container, these flow through devices do not prevent the presence of insects at or near the drink opening.

Flow through devices also do not provide a means to prevent spillage at times when the container is jostled, bumped, or otherwise casually disturbed. Further, because the device comes in contact with the beverage during use, cleaning is required before reuse and storage. Flow through devises also alter the flow characteristics of the beverage as well as impart an unexpected, uncomfortable, or otherwise unusual feel when drinking from the container.

U.S. Pat. No. 4,938,379 discloses a cover for a beverage container in which the cover fits over the entire top of the container. Although this devise is reusable by design, it's shape and size makes it inconvenient and cumbersome to carry.

U.S. Pat. No. 6,098,830 discloses a devise that is attached to the tab actuator. The cover is fitted with a locking section that is snapped over the lip of the container to secure the cover over the drink opening. The cover must be unsnapped before it can be adjusted to expose the drink opening. Snapping and unsnapping the devise will challenge the work hardening of the tab actuator and cause it to fail after repeated adjustments.

BRIEF SUMMARY OF THE INVENTION

The present invention provides a rotatable drink opening cover for a conventional beverage container. The container has a tab actuator pivotably connected to the lid for displacing a shearable tab, thereby exposing a drink opening. The container has a lid, a lip disposed peripherally around the lid and extending above the lid.

The present invention is secured to the container by placing the devise under the tab actuator, on the lid, and within the lip of the container. The devise is adapted to receive and engage the tab actuator and is rotated in concert with the tab actuator to cover and uncover the drink opening. The devise is minimally dimensioned to cover the drink opening.

It is the object of the present invention to provide a rotatable drink opening cover that is inexpensive to manufacture, convenient to carry, minimizes spillage, easily applied and removed by the consumer, is reusable, and prevents the entry of objectionable debris including insects.

Features and advantages of the present invention will become apparent upon review of the following specification and drawings.

DETAILED DESCRIPTION OF THE INVENTION

Figure 1:
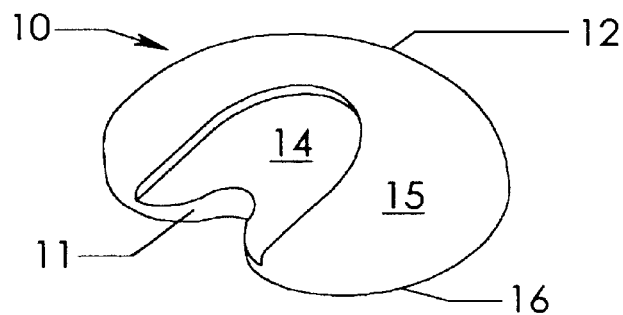
FIG. 1 shows a perspective view of the present invention.

FIG. 1 shows a perspective view of a rotatable drink opening cover 10 according to the present invention. Cover 10 is generally wedge shaped, increasing in thickness from front edge 11 to back edge 12. Cover 10 includes a recessed top portion 14 on a rounded top 15. Bottom edge 16 of cover 10 is minimally dimensioned to cover a drink opening.

Figure 2:
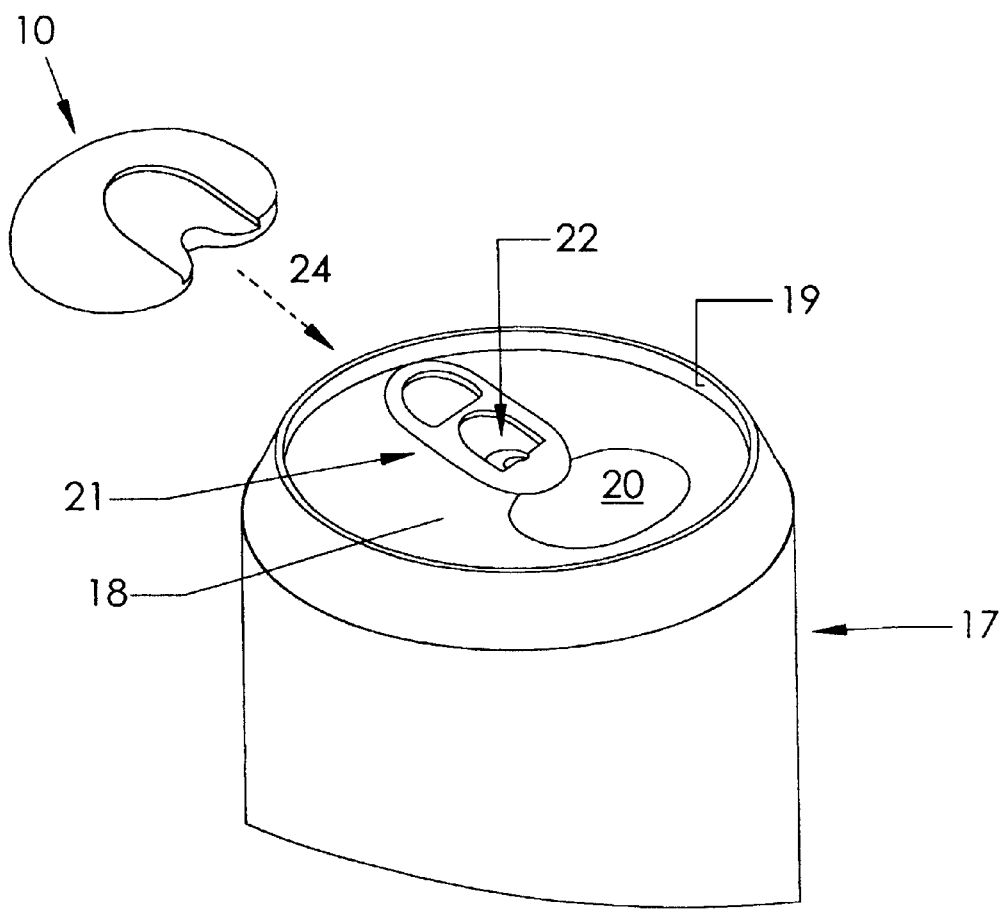
FIG. 2 shows a perspective view of the present invention aligned to be installed upon a conventional beverage container.

FIG. 2 shows a perspective view of cover 10 aligned to be removably installed upon a conventional beverage container 17. Container 17 includes a lid 18 having a shearable tab 20, surrounded by a lip 19. Container 17 further includes a pliable tab actuator 21 that is pivotably secured by rivet 22 centrally disposed on lid 18.

As known, tab actuator 21 is lifted upward thereby displacing shearable tab 20 to expose a drink opening. With tab actuator 21 returned substantially to it's original planar relationship with lid 18, cover 10 may be installed upon container 17. Alignment arrow 24 reveals the orientation required for cover 10 to be received and engaged under tab actuator 21, on lid 18, and between rivet 22 and lip 19.

Figure 3:
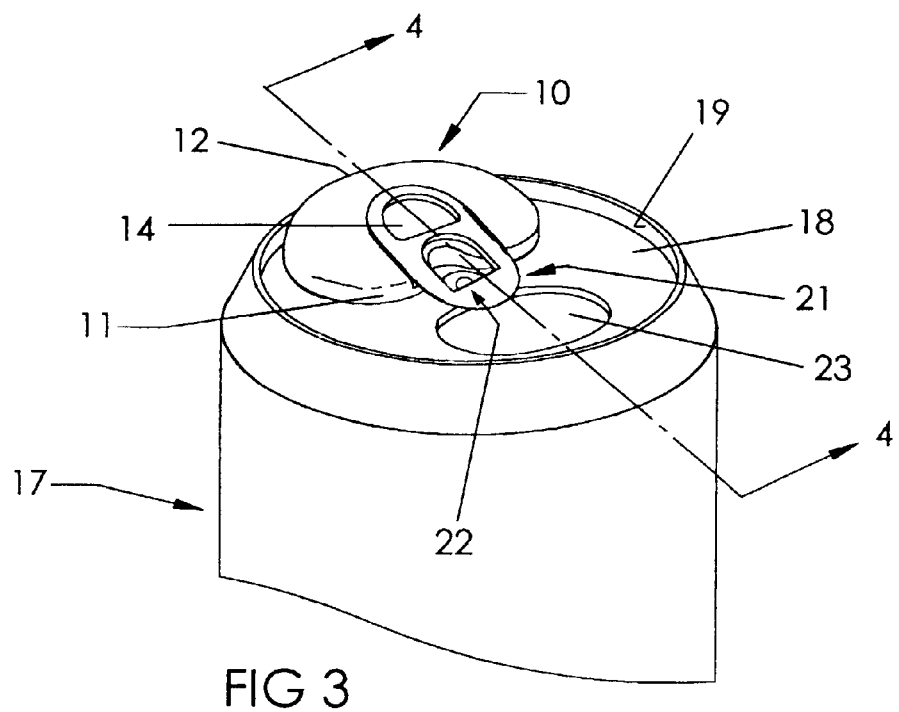
FIG. 3 shows a perspective view of the present invention installed upon a conventional beverage container in the open position.

FIG. 3 shows a perspective view of cover 10 on lid 18 of container 17 where drink opening 23 is uncovered. To secure cover 10 upon container 17, cover 10 is placed under tab actuator 21, on lid 18, and between rivet 22 and lip 19. Recessed top portion 14 of cover 10, having an inclined surface, is dimensioned and configured to receive and engage tab actuator 21, and further to secure cover 10 upon container 17 to prevent accidental removal. Cover 10 and tab actuator 21 are easily rotated in concert about rivet 22 thereby providing the means to cover and uncover drink opening 23.

Figure 4:
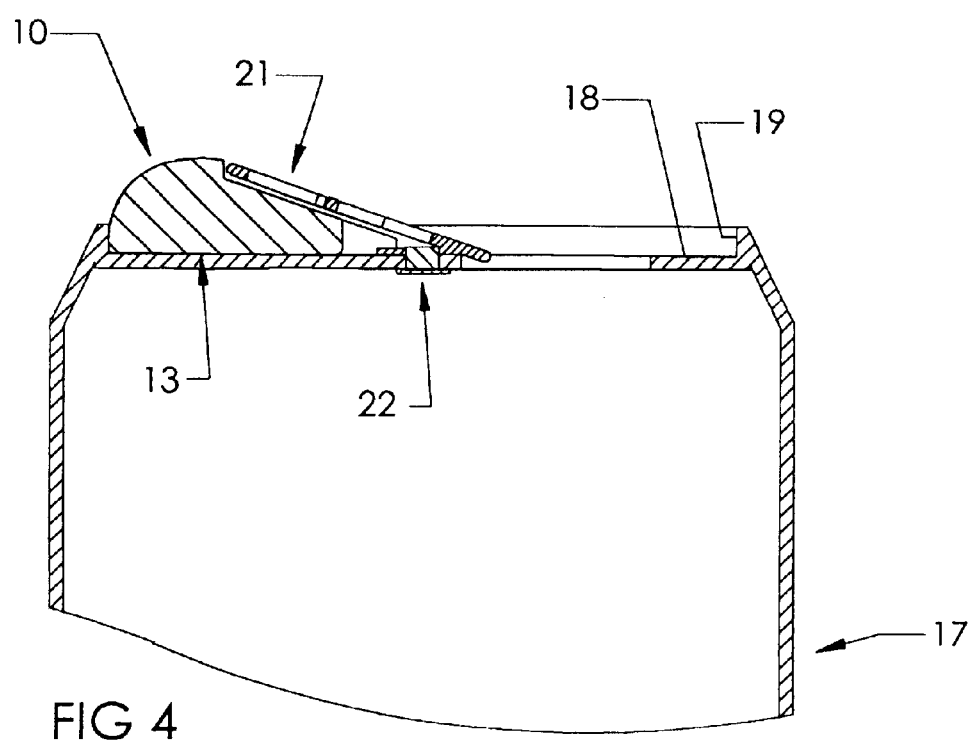
FIG. 4 shows a cross-sectional view of the present invention installed upon a conventional beverage container taken along line 4 of FIG. 3.

FIG. 4 shows a cross sectional view of cover 10 installed upon container 17. Bottom 13 of cover 10 is substantially flat providing for a relatively flush fit against lid 18. Cover 10 is dimensioned and configured to sit securely yet rotatably under tab actuator 21, on lid 18, and between rivet 22 and lip 19

Figure 5:
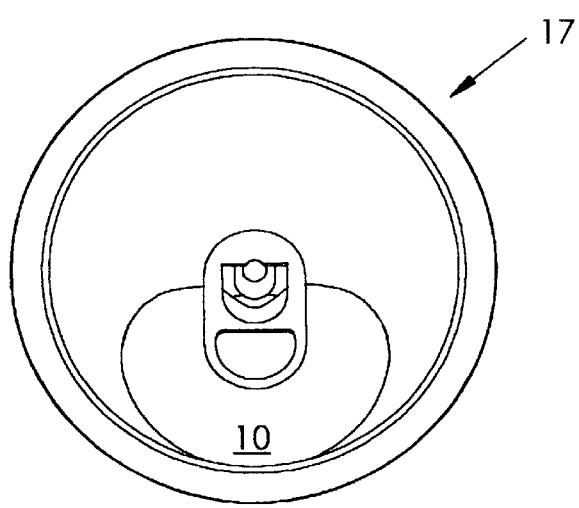
FIG. 5 shows a top plan view of the present invention installed upon a conventional beverage container in the closed position.

FIG. 5 shows a top plan view of cover 10 installed upon container 17 rotated to the closed position.

Figure 6:
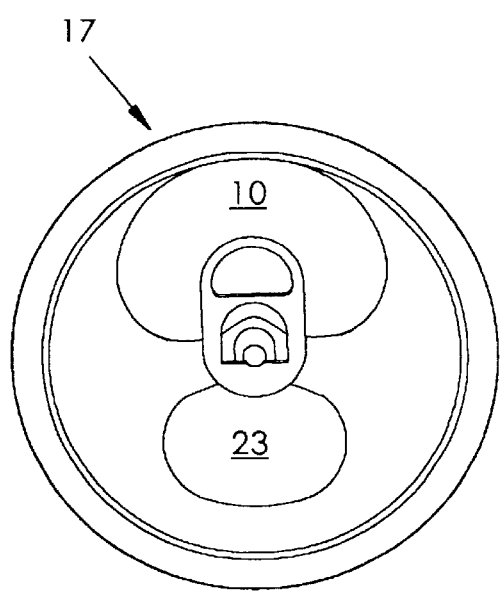
FIG. 6 shows a top plan view of the present invention installed upon a conventional beverage container in the open position.

FIG. 6 shows a top plan view of cover 10 installed upon container 17 rotated to the open position, uncovering drink opening 23.

Figure 7:
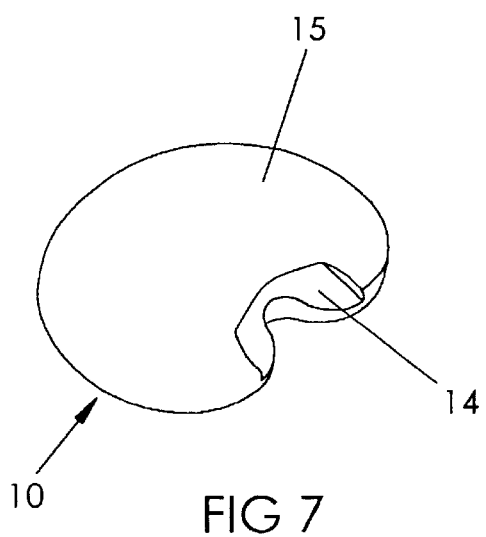
FIG. 7 shows a variation of the present invention from a perspective view.

FIG. 7 shows a variation of cover 10 in perspective view. Recessed top portion 14 is substantially enclosed, maximizing the surface area of top 15. This variation allows the application of promotional information, advertisement, logos, and the like.

The devise is a simple, yet effective method for rotatably covering a beverage container drink opening. The present invention is simply constructed and inexpensive to manufacture. It is reusable, convenient to carry, minimizes spillage, easily applied by the consumer, and prevents the entry of objectionable debris including insects. Preferably, the present invention is a single-piece devise, injection molded from nylon or plastic.

REFERENCE NUMERALS IN DRAWINGS 10 cover
11 front edge
12 back edge
13 bottom
14 recessed top portion
15 top
16 bottom edge
17 can
18 lid
19 lip
20 shearable tab
21 tab actuator
22 rivet
23 drink opening
24 alignment arrow

What I claim as my invention is:

1. A rotatable cover for a drink opening in a beverage container, aid beverage container having a lid, a lip disposed peripherally around said lid and extending above said lid, a shearable tab, and a tab actuator pivotable to displace said tab and expose a drink opening, said tab actuator being pivotably attached to said lid by a rivet centrally disposed on said lid, said cover being dimensioned and configured to sit rotatably under said tab actuator, on said lid, and between said rivet and said lip, said cover having a bottom surface larger than said drink opening, said cover having at least a recessed top portion.

2. The cover in claim 1, wherein said recessed top portion having an inclined surface adapted to receive and engage said tab actuator.

3. The cover of claim 1 further including means for rotatably securing said cover to said container, said means comprising said recessed top portion of said cover which receives and engages said tab actuator, whereby said cover will be removably placed under said tab actuator, on said lid, between said rivet and said lip, whereby being subjected to an external force, said cover will fully rotate in concert with said tab actuator about said rivet.

4. A method to rotatably cover a drink opening in the lid of a beverage container, said beverage container having a lid, a lip disposed peripherally around said lid and extending above said lid, a shearable tab, and a tab actuator pivotable to displace said tab and expose said drink opening, said cover being dimensioned and configured to sit rotatably under said tab actuator, on said lid, and between said rivet and said lip, said cover having a bottom surface larger than the drink opening, said cover having at least a recessed top portion, said recessed top portion having an inclined surface adapted to receive and engage said tab actuator, said tab actuator being pivotably attached to said lid by a rivet centrally disposed on said lid, said method comprising:

raising said tab actuator to displace said shearable tab and thereby expose said drink opening in said lid, depressing said tab actuator until it is returned substantially to it's original planar relationship with said lid, aligning said recessed top portion with said tab actuator and placing said cover on said lid thereby engaging said tab actuator with said recessed top portion, whereby being subjected to an external force, said cover will fully rotate in concert with said tab actuator about said rivet to cover and uncover said drink opening.

* * * * *